US012738507B2

(12) United States Patent
Takeyama et al.

(10) Patent No.: US 12,738,507 B2
(45) Date of Patent: Sep. 15, 2026

(54) METAL SHEET, BATTERY, NICKEL-ZINC BATTERY AND METHOD FOR MANUFACTURING METAL SHEET

(71) Applicants: SUMITOMO ELECTRIC INDUSTRIES, LTD., Osaka (JP); SUMITOMO ELECTRIC TOYAMA CO., LTD., Toyama (JP)

(72) Inventors: Tomoharu Takeyama, Osaka (JP); Kazuki Okuno, Osaka (JP); Masatoshi Majima, Toyama (JP); Hitoshi Tsuchida, Toyama (JP)

(73) Assignees: SUMITOMO ELECTRIC INDUSTRIES, LTD., Osaka (JP); SUMITOMO ELECTRIC TOYAMA CO., LTD., Toyama (JP)

(*) Notice: Subject to any disclaimer, the term of this patent is extended or adjusted under 35 U.S.C. 154(b) by 434 days.

(21) Appl. No.: 18/262,092

(22) PCT Filed: Dec. 23, 2022

(86) PCT No.: PCT/JP2022/047715

§ 371 (c)(1),
(2) Date: Jul. 19, 2023

(87) PCT Pub. No.: WO2024/134893

PCT Pub. Date: Jun. 27, 2024

(65) Prior Publication Data

US 2024/0396051 A1 Nov. 28, 2024

(51) Int. Cl.

*H01M 4/74* (2006.01)
*H01M 4/66* (2006.01)
*H01M 10/30* (2006.01)

(52) U.S. Cl.

CPC .......... *H01M 4/742* (2013.01); *H01M 4/661* (2013.01); *H01M 10/30* (2013.01)

(58) Field of Classification Search

CPC .............................. H01M 4/661; H01M 4/742
See application file for complete search history.

(56) References Cited

U.S. PATENT DOCUMENTS

2012/0288758 A1 11/2012 Hosoe et al.
2012/0295169 A1 11/2012 Hosoe et al.
(Continued)

FOREIGN PATENT DOCUMENTS

CN 114284567 A * 4/2022
CN 114551984 A * 5/2022 ........ H01M 10/0562
(Continued)

OTHER PUBLICATIONS

Specification, Claims, Abstract and Drawings of the U.S. Appl. No. 18/258,053, filed Jun. 16, 2023.
(Continued)

*Primary Examiner* — Jonathan G Jelsma
(74) *Attorney, Agent, or Firm* — IPUSA, PLLC

(57) ABSTRACT

A flat metal sheet has a principal surface located on one side along a thickness direction, a plurality of struts, a node part where end portions of the plurality of struts are connected to one another, and a plurality of through holes penetrating the principal surface in the thickness direction. The strut and the node part form a mesh structure, and the plurality of the struts are in close contact with each other.

23 Claims, 9 Drawing Sheets

(56) References Cited

U.S. PATENT DOCUMENTS

| | | | | |
|---|---|---|---|---|
| 2017/0207488 | A1* | 7/2017 | Zhamu | H01M 4/139 |
| 2020/0280063 | A1* | 9/2020 | Tiruvannamalai | H01M 4/40 |
| 2020/0377973 | A1 | 12/2020 | Okuno et al. | |
| 2021/0062299 | A1* | 3/2021 | Tsuchida | H01M 4/661 |
| 2023/0107979 | A1* | 4/2023 | Nishimura | H01M 4/36 429/245 |
| 2024/0213496 | A1 | 6/2024 | Takeyama et al. | |
| 2024/0396051 | A1 | 11/2024 | Takeyama et al. | |

FOREIGN PATENT DOCUMENTS

| | | | |
|---|---|---|---|
| JP | H05-343069 | 12/1993 | |
| JP | 2012-099427 | 5/2012 | |
| JP | 2012-186160 | 9/2012 | |
| JP | 2013-166137 | 8/2013 | |
| JP | 2017-188212 | 10/2017 | |
| WO | 2012/111665 | 8/2012 | |
| WO | 2019/163256 | 8/2019 | |
| WO | WO-2024034132 A1 * | 2/2024 | H01M 10/286 |
| WO | 2024/134892 | 6/2024 | |
| WO | 2024/134893 | 6/2024 | |

OTHER PUBLICATIONS

Office Action mailed on Jan. 9, 2026 with respect to the related U.S. Appl. No. 18/258,053.

Sakaida Hideaki et al: "Aluminum-Celmet-Aluminum Porous Metal with Three-Dimensional Consecutive Pores", Apr. 30, 2017 (Apr. 30, 2017), pp. 87-92, XP093358094, Retrieved from the Internet: URL:https://global-sei.com/technology/tr/bn84/pdf/84-15.pdf.

Notice of Allowance issued on Apr. 23, 2026 with respect to the related U.S. Appl. No. 18/258,053.

* cited by examiner

METAL SHEET, BATTERY, NICKEL-ZINC BATTERY AND METHOD FOR MANUFACTURING METAL SHEET

TECHNICAL FIELD

The present disclosure relates to metal sheets, batteries, nickel-zinc batteries, and methods for manufacturing metal sheets.

BACKGROUND ART

For example, Japanese Laid-Open Patent Publication No. 2017-188212 (Patent Document 1) describes a zinc electrode for a nickel-zinc storage battery and a method for manufacturing the same. The zinc electrode for the nickel-zinc storage battery described in Patent Document 1 has a zinc-active material attached to a perforated metal collector having a porosity of 15% to 45%.

PRIOR ART DOCUMENTS

Patent Documents

Patent Document 1: Japanese Laid-Open Patent Publication No. 2017-188212

DISCLOSURE OF THE INVENTION

A metal sheet according to the present disclosure is a flat metal sheet having a principal surface located on one side along a thickness direction, and including

- a plurality of struts, and a node part where end portions of the plurality of struts are connected to one another,
- wherein the strut and the node part form a mesh structure, and the plurality of the struts are in close contact with each other; and
- a plurality of through holes penetrating the principal surface in the thickness direction.

A battery according to the present disclosure includes the metal sheet according to the present disclosure as a collector.

A nickel-zinc battery according to the present disclosure includes the metal sheet according to the present disclosure as a collector.

A method for forming a metal sheet according to the present disclosure includes

- step of preparing a metal porous body having a flat shape and a skeleton with a three-dimensional mesh structure; and
- step of rolling the metal porous body in a thickness direction to manufacture the metal sheet according to the present disclosure.

BRIEF DESCRIPTION OF DRAWINGS

Figures 10, 11:
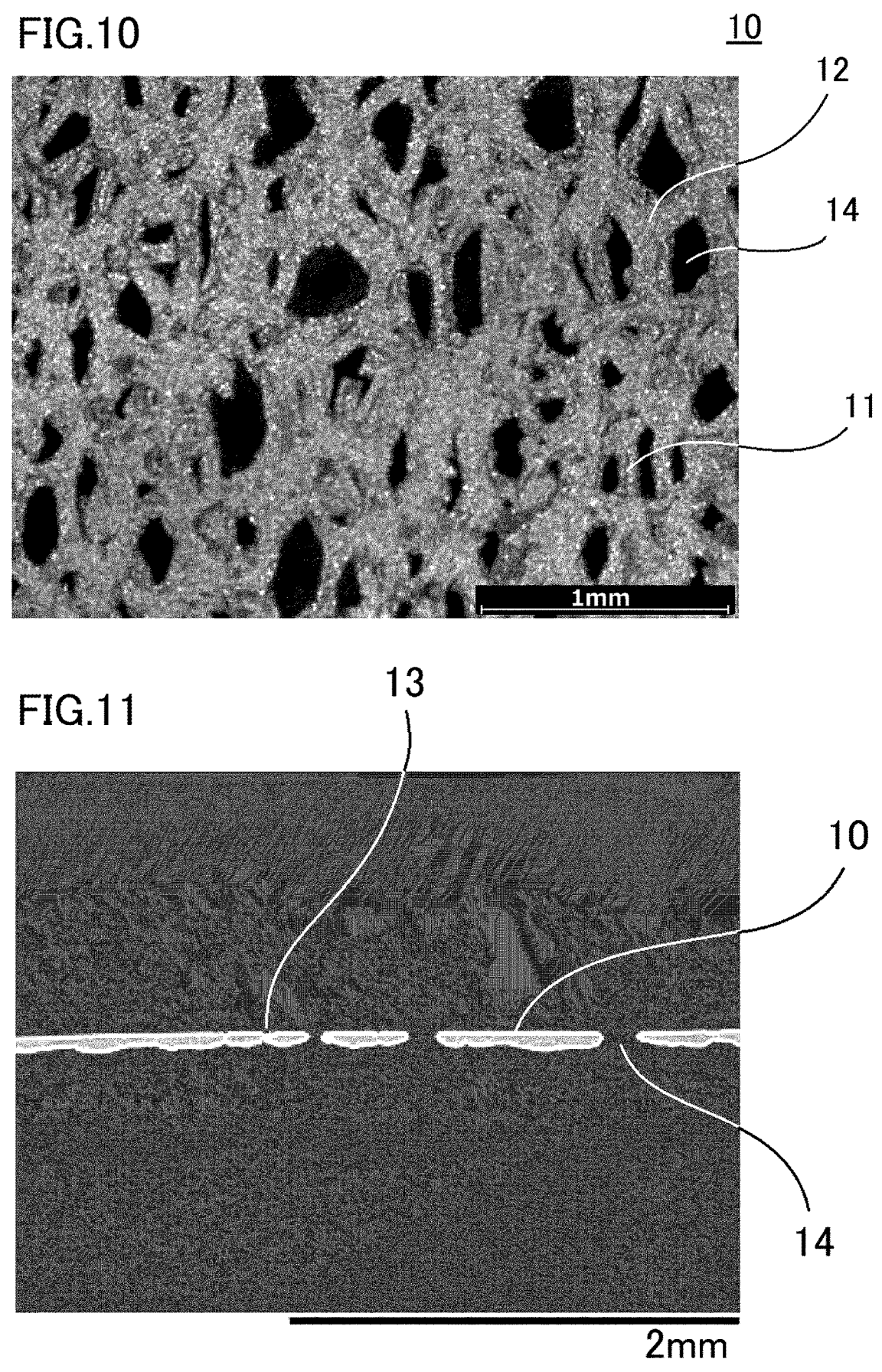

FIG. 10 is a photograph illustrating a result of observing the principal surface of another example of the metal sheet according to the present disclosure using a scanning electron microscope (SEM).

FIG. 11 is a photograph illustrating a result of observing the cross section of the other example of the metal sheet according to the present disclosure using a scanning electron microscope (SEM).

MODE OF CARRYING OUT THE INVENTION

Figure 1:
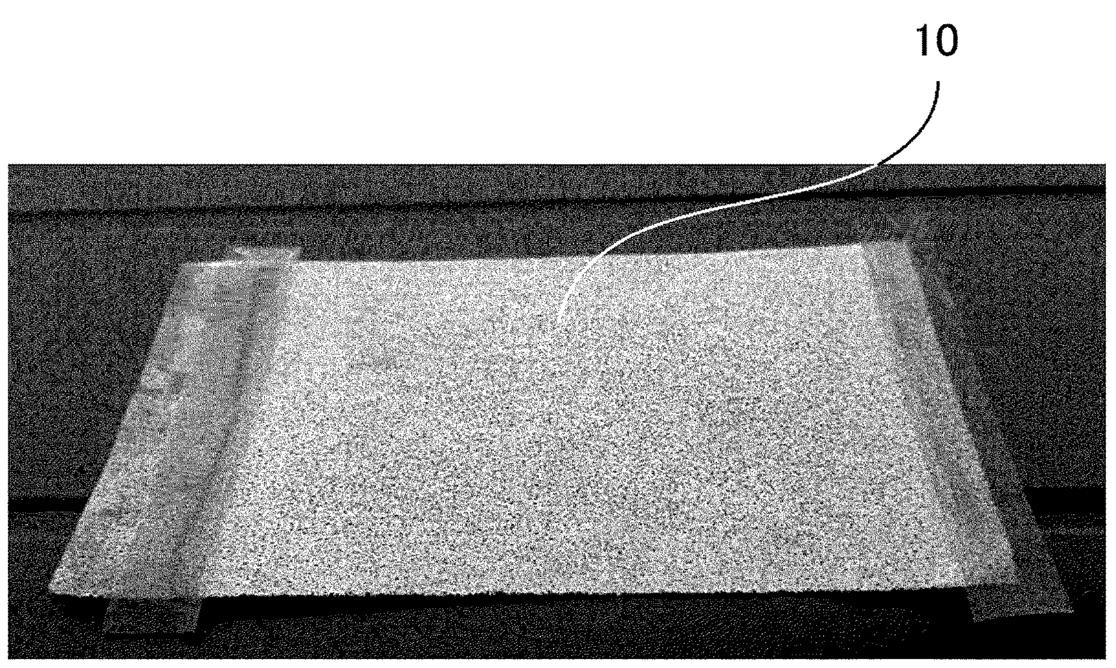
FIG. 1 is a photograph illustrating an external appearance of an example of a metal sheet according to the present disclosure.

Problems to be Solved by the Present Disclosure

As described above, Patent Document 1 discloses using a perforated metal having a porosity of 15% to 45% as a collector of a zinc electrode for a nickel-zinc storage battery. The perforated metal has a plurality of through holes formed in a metal plate, and a zinc-active material filling the through holes can be used as the electrode.

However, the through holes formed in the perforated metal have a uniform circular shape with a relatively large hole diameter on the order of several millimeters, and the perforated metal is unsuited for retention of an active material.

The present disclosure was conceived in view of the problems of the related art described above. More particularly, one object of the present disclosure is to provide a metal sheet, usable as a collector of a battery, and exhibiting an excellent retention of an active material.

Effects of the Present Disclosure

According to the present disclosure, it is possible to provide a metal sheet, usable as the collector of the battery, and exhibiting an excellent retention of an active material.

Description of Embodiments of the Present Disclosure

First, embodiments of the present disclosure will be described in the following.

(1) A metal sheet according to the present disclosure is a flat metal sheet having a principal surface located on one side along a thickness direction, including:

a plurality of struts, and a node part where end portions of the plurality of struts are connected to one another, wherein the strut and the node part form a mesh structure, and the plurality of the struts are in close contact with each other; and a plurality of through holes penetrating the principal surface in the thickness direction.

According to an aspect of the disclosure described in (1) above, it is possible to provide a metal sheet, usable as a collector of a battery, and exhibiting an excellent retention of an active material.

The strut refers to a rod shaped or plate shaped part forming a mesh structure. The node part refers to a part where end portions of a plurality of struts are connected to one another.

(2) In the metal sheet according to (1) above, the strut may have a strip shape.

According to an aspect of the disclosure described in (2) above, it is possible to provide a metal sheet having a smaller thickness.

(3) In the metal sheet according to (1) or (2) above, the plurality of the struts at a twisted position may have a laminated shape.

According to an aspect of the disclosure described in (3) above, it is possible to provide a metal sheet having a more complex mesh structure formed by the struts laminated in the thickness direction.

(4) In the metal sheet according to any one of (1) to (3) above, the through holes may have a non-uniform hole diameter along the thickness direction of the metal sheet.

According to an aspect of the present disclosure described in (4) above, it is possible to provide a metal sheet exhibiting a higher retention of an active material when used as the collector of the battery.

The hole diameter of the through holes refers to a largest diameter portion of the through hole at an outermost surface of the principal surface.

(5) In the metal sheet according to any one of (1) to (4) above, the through holes may have a hole diameter greater than or equal to 1 μm and less than or equal to 900 μm at the principal surface.

According to an aspect of the disclosure described in (5) above, it is possible to provide a metal sheet exhibiting a high retention of the active material, and can retain a large amount of the active material when used as the collector of the battery.

(6) In the metal sheet according to any one of (1) to (5) above, a number of the through holes provided per 500 $\mu m^2$ may be greater than or equal to 250 and less than or equal to 2500 at the principal surface.

According to an aspect of the disclosure described in (6) above, it is possible to provide a metal sheet that is lightweight, and can retain a large amount of the active material when used as the collector of the battery.

(7) In the metal sheet according to any one of (1) to (6) above, a porosity may be greater than or equal to 10% and less than or equal to 40%.

According to an aspect of the disclosure described in (7) above, it is possible to provide a metal sheet that is lightweight, and can retain a large amount of the active material when used as the collector of the battery.

(8) In the metal sheet according to any one of (1) to (7) above, the metal sheet may have a surface and an interior, the surface may include the principal surface, a back surface located on an opposite side from the principal surface, and an outer peripheral surface of the metal sheet, the interior may be covered by the surface, and the metal sheet may have an independent space in the interior, surrounded by the strut and the node part.

According to an aspect of the disclosure described in (8) above, it is possible to provide a metal sheet that is lighter in weight.

(9) In the metal sheet according to any one of (1) to (8) above, three or more struts may be connected to the node part.

According to an aspect of the disclosure described in (9) above, it is possible to provide a metal sheet having a more complex mesh structure formed by the struts and the node part.

(10) In the metal sheet described in any one of (1) to (9) above, the strut may have a thickness greater than or equal to 1 μm and less than or equal to 10 μm.

According to an aspect of the disclosure described in (10) above, it is possible to provide a metal sheet having a smaller thickness.

The thickness of the strut refers to a thickness of a center portion between one end portion of the strut connected to the node part, and the other end portion of the strut.

(11) In the metal sheet described in any one of (1) to (10) above, the strut may have a length greater than or equal to 50 μm and less than or equal to 500 μm.

According to an aspect of the disclosure described in (11) above, it is possible to provide a metal sheet having a mesh structure with a finer mesh shape formed by the strut and the node part.

The length of the strut refers to a distance from the one end portion of the strut connected to the node part to the other end portion of the strut.

(12) In the metal sheet described in any one of (1) to (11) above, the strut may have a width greater than or equal to 100 μm and less than or equal to 3000 μm.

According to an aspect of the disclosure described in the (12) above, it is possible to provide a metal sheet having a mesh structure with a finer mesh shape formed by the strut and the node part.

The width of the strut refers to a width of a center portion between the one end portion of the strut connected to the node part, and the other end portion of the strut.

(13) In the metal sheet according to any one of (1) to (12) above, the strut may include a portion having two or more layers and five or less layers of the strut laminated in the thickness direction of the metal sheet.

According to an aspect of the disclosure described in (13) above, it is possible to provide a metal sheet having a more complex mesh structure formed by the strut and the node part.

(14) In the metal sheet according to any one of (1) to (13) above, a thickness of the metal sheet may be greater than or equal to 10 μm and less than or equal to 100 μm.

According to an aspect of the disclosure described in (14) above, it is possible to provide a thin metal sheet.

The thickness of the metal sheet refers to a distance between the principal surface of the flat metal sheet, and the back surface located on an opposite side from the principal surface.

(15) In the metal sheet according to any one of (1) to (14) above, the metal sheet may have a plurality of recesses at the principal surface.

According to an aspect of the disclosure described in (15) above, it is possible to provide a metal sheet exhibiting a high retention of the active material when used as the collector of the battery.

It is assumed that the recess does not include a through hole described above.

(16) In the metal sheet according to any one of (1) to (15) above, the recesses may have a diameter greater than or equal to 1 μm and less than or equal to 900 μm at the principal surface.

According to an aspect of the disclosure described in (16) above, it is possible to provide a metal sheet exhibiting a higher retention of the active material when used as the collector of the battery.

The diameter of the recess at the principal surface refers to a largest diameter portion of the recess at an outermost surface of the principal surface.

(17) In the metal sheet according to (15) or (16) above, the recesses may have a non-uniform diameter along the thickness direction of the metal sheet.

According to an aspect of the disclosure described in (17) above, it is possible to provide a metal sheet exhibiting a higher retention of the active material when used as the collector of the battery.

(18) In the metal sheet according to any one of (15) to (17) above, a number of the recesses provided at the principal surface may be greater than or equal to 75 and less than or equal to 750 per 500 $\mu m^2$.

According to an aspect of the disclosure described in (18) above, it is possible to provide a metal sheet that can retain a large amount of the active material when used as the collector of the battery.

(19) In the metal sheet according to any one of (1) to (18) above, the metal sheet may be formed of one or more kinds of materials selected from a group consisting of copper, nickel, aluminum, gold, silver, tin, and chromium.

According to an aspect of the disclosure described in (19) above, it is possible to provide a metal sheet usable for various applications.

(20) In the metal sheet according to any one of (8) to (19) above, the surface may include tin, and the interior may include copper.

According to an aspect of the disclosure described in (20) above, it is possible to provide a metal sheet suitable for use as a collector of a nickel-zinc battery.

(21) In the metal sheet according to any one of (1) to (19) above, the strut and the node part may have a surface, and an interior surrounded by the surface, the surface may include tin, and the interior may include copper.

According to an aspect of the disclosure described in (21) above, it is possible to provide a metal sheet suitable for use as the collector of the nickel-zinc battery.

(22) A battery according to the present disclosure may include the metal sheet according to any one of (1) to (21) above as a collector.

According to an aspect of the disclosure described in (22) above, it is possible to provide a battery exhibiting an excellent retention of an active material.

(23) A nickel-zinc battery according to the present disclosure includes the metal sheet according to (20) or (21) above as a collector.

According to an aspect of the disclosure described in (23) above, it is possible to provide a nickel-zinc battery exhibiting an excellent retention of an active material.

(24) A method for manufacturing a metal sheet according to the present disclosure includes step of preparing a metal porous body having a flat shape and a skeleton with a three-dimensional mesh structure; and step of rolling the metal porous body in a thickness direction to manufacture the metal sheet according to (1) above.

According to an aspect of the disclosure described in (24) above, it is possible to provide a method for manufacturing the metal sheet capable of manufacturing the metal sheet according to the present disclosure described above.

Details of Embodiments of the Present Disclosure

Hereinafter, specific examples of the metal sheet, the battery, the nickel-zinc battery, and the method for manufacturing the metal sheet according to embodiments of the present disclosure will be described in more detail, with reference to the drawings as appropriate. The present disclosure is not limited to these examples, and is intended to include all modifications within the meaning and scope equivalent to the scope of the claims, as exemplified by the claims. Further, in the following drawings, the same or corresponding portions are designated by the same reference numerals, and a redundant description thereof will be omitted.

[Metal Sheet]

A configuration of a metal sheet according to one embodiment of the present disclosure will be described in the following.

Figure 2:
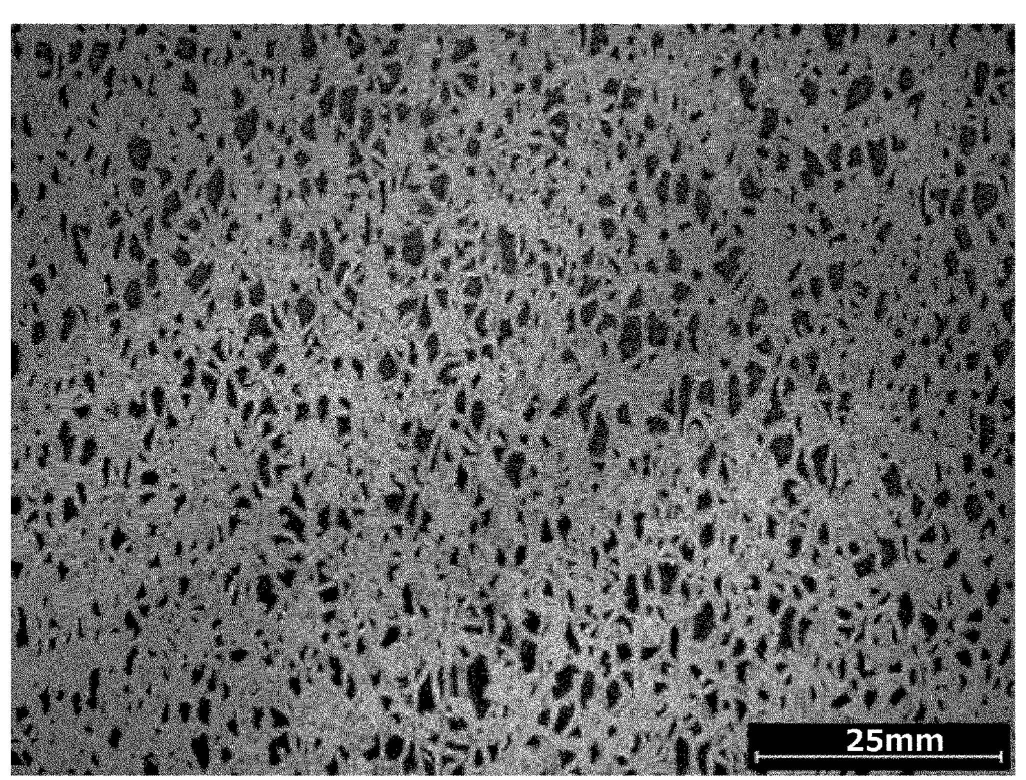
FIG. 2 is a photograph illustrating a result of observing a principal surface of the example of the metal sheet according to the present disclosure using a scanning electron microscope (SEM).
Figure 3:
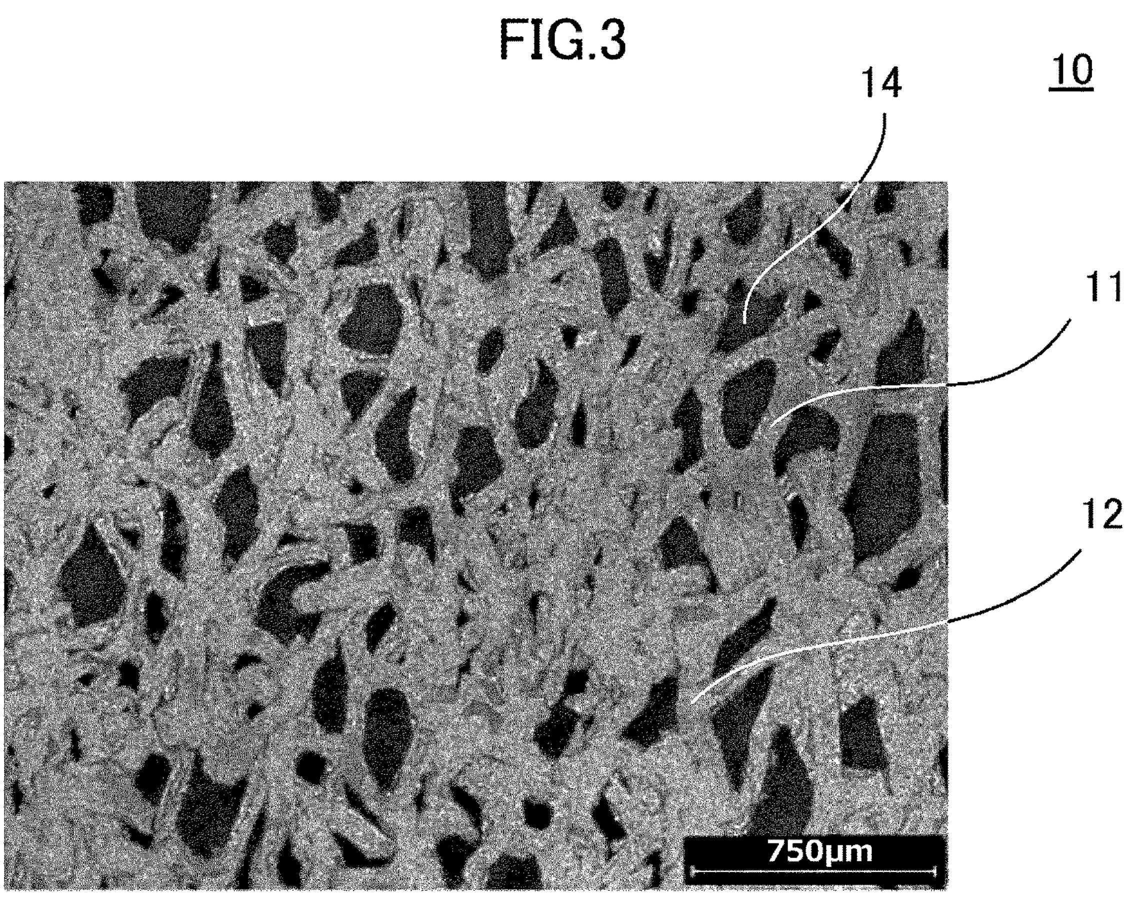
FIG. 3 is a partially enlarged photograph of the photograph illustrated in FIG. 2.

FIG. 1 is a photograph illustrating an external appearance of an example of a metal sheet 10. FIG. 2 is a photograph illustrating a result of observing a principal surface of the metal sheet 10 using a scanning electron microscope (SEM). FIG. 3 is a partially enlarged photograph of the photograph illustrated in FIG. 2.

As illustrated in FIG. 1, the metal sheet 10 has a flat shape, and a principal surface located on one side in a thickness direction. Further, as illustrated in FIG. 2 and FIG. 3, the metal sheet 10 includes a plurality of struts 11, and a node part 12 where end portions of the plurality of struts 11 are connected to one another. The strut 11 and the node part 12 form a mesh structure. The plurality of the struts 11 include portions that are in close contact with one another.

Because the metal sheet 10 has the mesh structure formed by the strut 11 and node part 12, an active material of a battery fills portions of the mesh structure when the active material is coated on the metal sheet 10. For this reason, the metal sheet 10 can be used as a collector of a battery electrode exhibiting an excellent retention of the active material and capable of retaining a large amount of the active material. In addition, because the plurality of struts 11 are in close contact with each other but are not bonded to each other, the struts 11 are slidable at an interface, and the metal sheet 10 is strong against bending and has an excellent flexibility.

The strut 11 is a rod shaped or plate shaped part forming a mesh structure, as illustrated in FIG. 2 and FIG. 3, and may have a strip shape. In a case where the strut 11 has the strip shape, a thickness of the metal sheet 10 becomes thinner.

The node part 12 is a part where end portions of the plurality of struts 11 are connected to one another, as illustrated in FIG. 2 and FIG. 3. The end portions of three or more struts 11 may be connected to the node part 12. In this case, the mesh structure of the metal sheet 10 becomes more complex.

Figure 4:
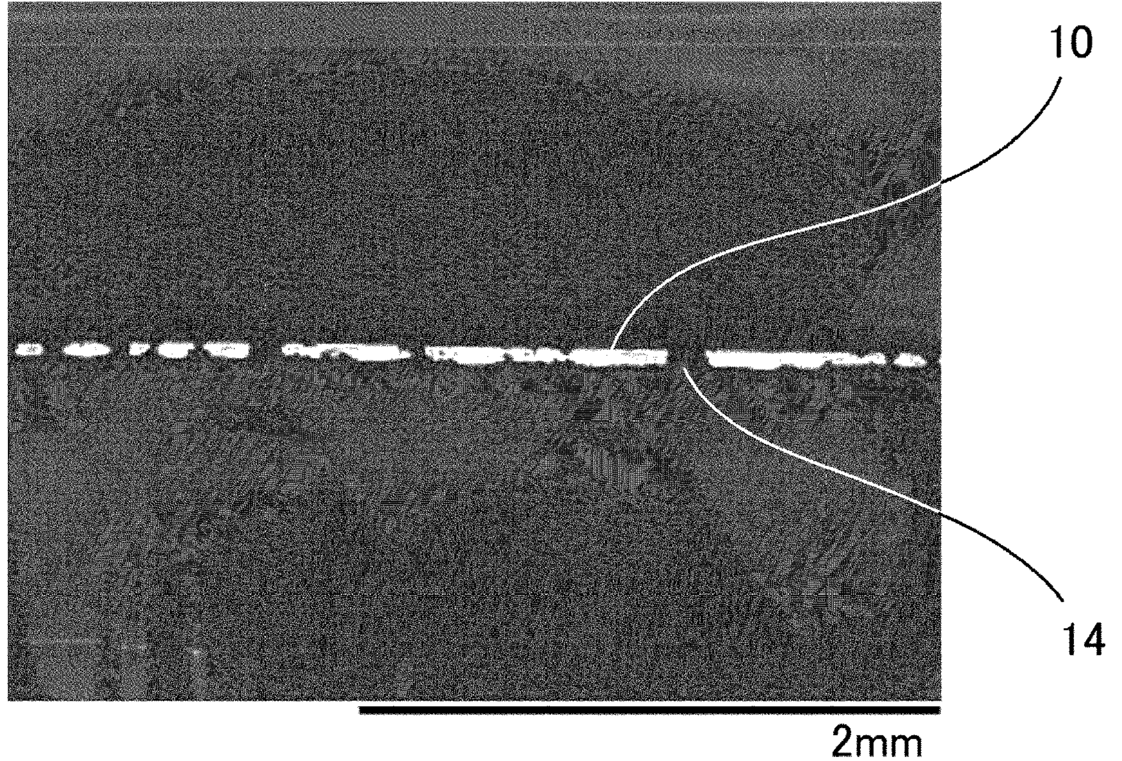
FIG. 4 is a photograph illustrating a result of observing a cross section of the example of the metal sheet according to the present disclosure using a scanning electron microscope (SEM).
Figure 5:
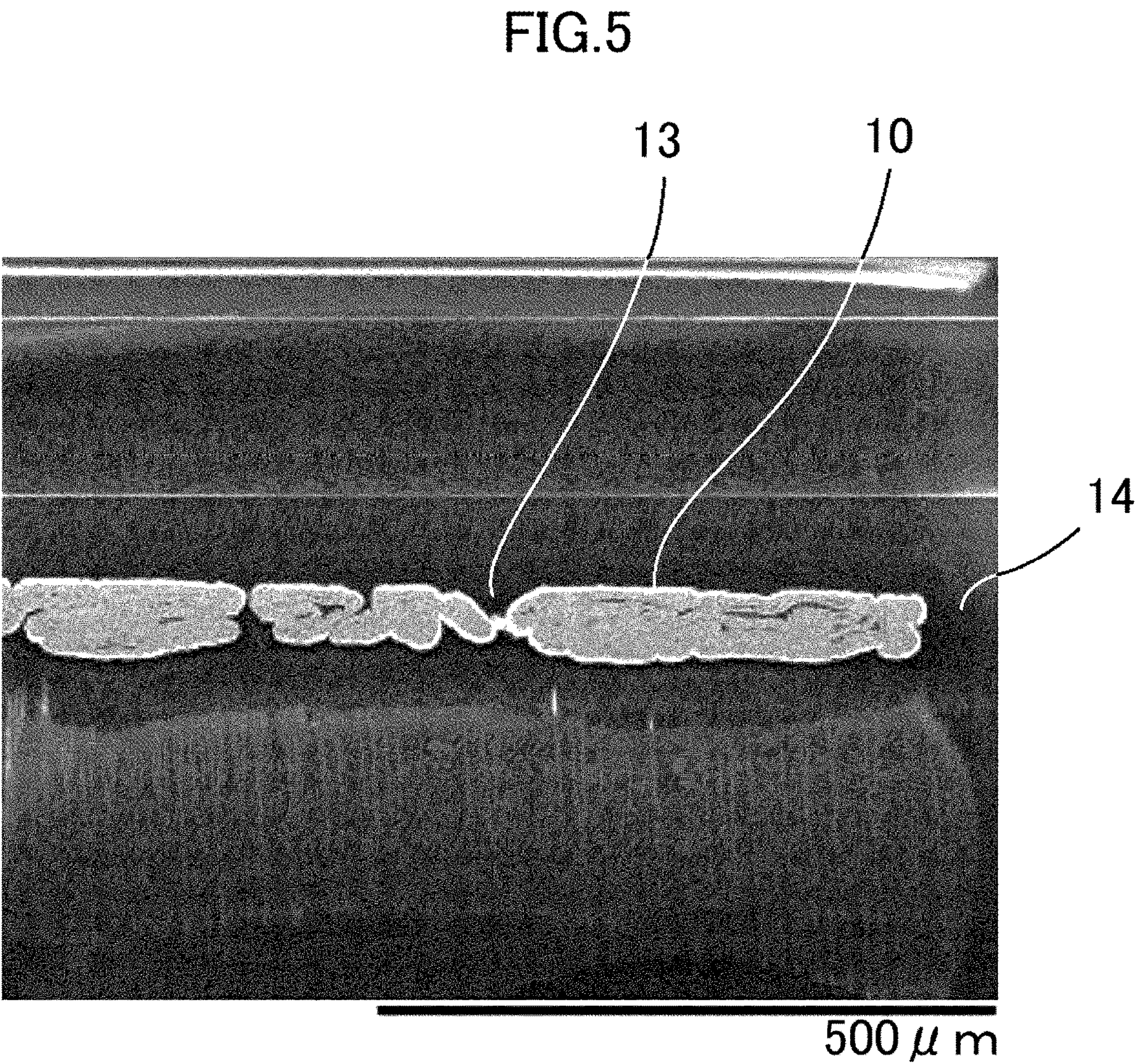
FIG. 5 is a partially enlarged photograph of the photograph illustrated in FIG. 4.
Figure 6:
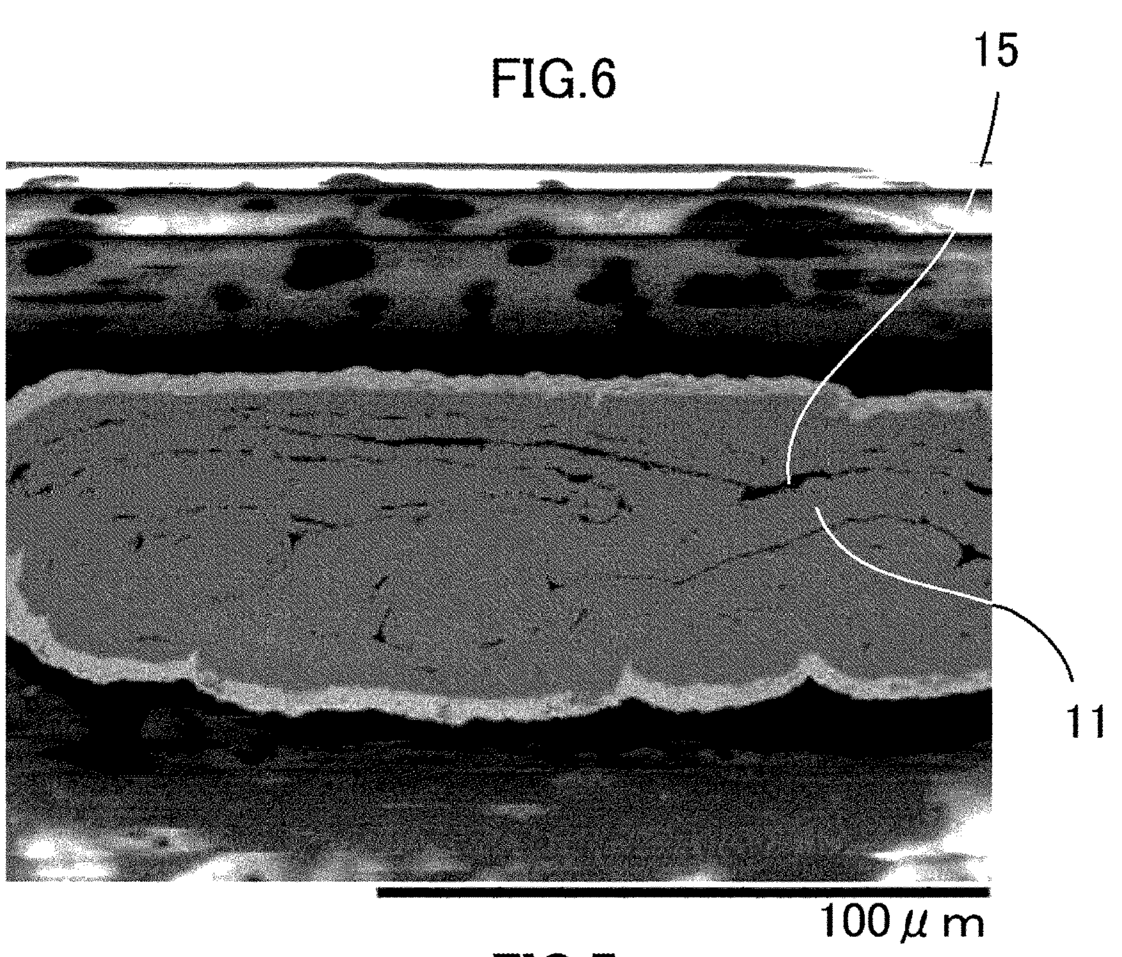
FIG. 6 is a partially enlarged photograph of the photograph illustrated in FIG. 5.
Figure 7:
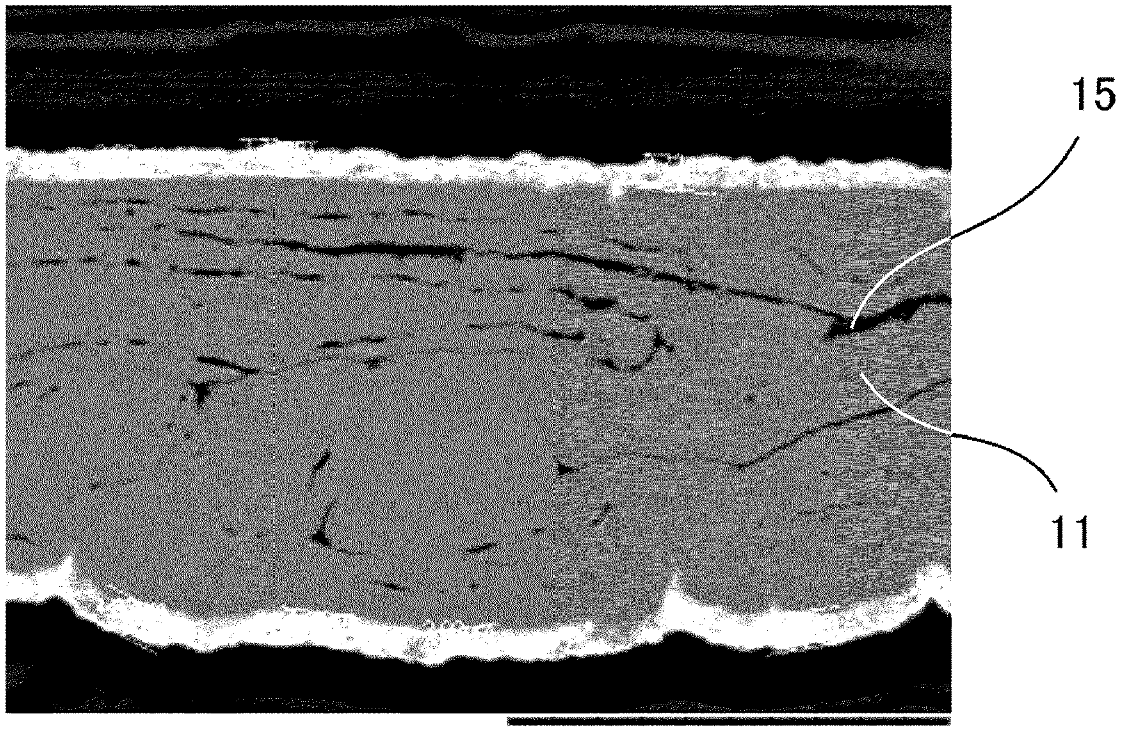
FIG. 7 is a partially enlarged photograph of the photograph illustrated in FIG. 6.

FIG. 4 is a photograph illustrating a result of observing a cross section of the metal sheet 10 using a scanning electron microscope (SEM). In addition, FIG. 5 illustrates a partially enlarged photograph of FIG. 4, FIG. 6 illustrates a partially enlarged photograph of FIG. 5, and FIG. 7 illustrates a partially enlarged photograph of FIG. 6.

As illustrated in FIG. 3 and FIG. 4, the metal sheet 10 includes a plurality of through holes 14 penetrating the principal surface in the thickness direction. Hence, the metal sheet 10 can be made lighter. In addition, a high retention of the active material can be achieved when the metal sheet 10 is used as the collector of the battery.

A hole diameter of the through holes 14 may be non-uniform along the thickness direction of the metal sheet 10. In this case, when the active material of the battery fills the metal sheet 10, the active material is more easily accumulated inside the through holes 14.

Moreover, the hole diameter of the through holes 14 at the surface described above may be greater than or equal to 1 μm and less than or equal to 900 μm. The hole diameter of the through holes 14 at the principal surface refers to a largest diameter portion of the through holes 14 at an outermost surface of the principal surface. In another example, the hole diameter of the through holes 14 may be greater than or equal to 1 μm and less than or equal to 500 μm. In still another example, the hole diameter of the through holes 14 may be greater than or equal to 1 μm and less than or equal to 250 μm.

According to these configurations, it is possible to further increase the retention of the active material and the retainable amount of the active material when the metal sheet 10 is used as the collector of the battery.

A number of the through holes 14 provided per 500 $\mu m^2$ may be greater than or equal to 250 and less than or equal to 2500 at the principal surface, for example. In another example, the number of the through holes 14 provided per 500 $\mu m^2$ may be greater than or equal to 250 and less than or equal to 1250 at the principal surface. In still another example, the number of the through holes 14 provided per 500 $\mu m^2$ may be greater than or equal to 250 and less than or equal to 625 at the principal surface.

In the case where the metal sheet 10 is used as the collector of the battery when the number of the through holes 14 at the principal surface of the metal sheet 10 falls within ranges described above, it is possible to make the battery lighter and increase the retainable amount of the active material.

The number of the through holes 14 provided can be observed at the principal surface of the metal sheet 10 using a microscope, by counting a number of through holes present inside a range of 500 $\mu m^2$ at 10 arbitrary locations on the principal surface, and averaging the numbers counted at the 10 arbitrary locations.

The metal sheet 10 may have a porosity greater than or equal to 10% and less than or equal to 40%. The porosity refers to a ratio (percentage) of an area occupied by the through holes 14 with respect to an apparent area of the principal surface of the metal sheet 10. In another example, the porosity may be greater than or equal to 10% and less than or equal to 30%. In still another example, the porosity may be greater than or equal to 10% and less than or equal to 25%.

When the porosity of the metal sheet 10 falls within the range described above, the metal sheet 10, when used as the collector of the battery, can be made lighter, and can retain a larger amount of the active material.

The metal sheet 10 has a surface, and an interior. The surface includes the principal surface, a back surface located on the opposite side from the principal surface, and an outer peripheral surface of the metal sheet 10. The interior of the metal sheet 10 is a portion covered by the surface.

As illustrated in FIG. 6 and FIG. 7, the metal sheet 10 may have an independent space 15 in the interior, surrounded by the strut 11 and the node part 12. The independent space 15 is typically a void. Because the metal sheet 10 has the independent space 15 in the interior, the weight of the metal sheet 10 can further be reduced.

A thickness of strut 11 may be greater than or equal to 1 μm and less than or equal to 10 μm. The thickness of the strut 11 refers to a thickness of a center portion between one end portion of the strut 11 connected to the node part 12, and the other end portion of the strut 11. In another example, the thickness of the strut 11 may be greater than or equal to 1 μm and less than or equal to 8 μm. In still another example, the thickness of the strut 11 may be greater than or equal to 1 μm and less than or equal to 5 μm.

Because the thickness of the strut 11 is small, it is possible to provide the metal sheet 10 having a smaller thickness.

A length of the strut 11 may be greater than or equal to 50 μm and less than or equal to 500 μm. The length of the strut 11 refers to a distance from the one end portion of the strut 11 connected to the node part 12, to the other end portion of the strut 11. In another example, the length of the strut 11 may be greater than or equal to 50 μm and less than or equal to 250 μm. In still another example, the length of the strut 11 may be greater than or equal to 50 μm and less than or equal to 100 μm.

When the length of the strut 11 falls within the range described above, it is possible to provide the metal sheet 10 having the mesh structure with finer meshes.

A width of the strut 11 may be greater than or equal to 100 μm and less than or equal to 3000 μm. The width of the strut 11 refers to a width of the center portion between the one end portion of the strut 11 connected to the node part 12, and the other end portion of the strut 11. In another example, the width of the strut 11 may be greater than or equal to 100 μm and less than or equal to 1000 μm. In still another example, the width of the strut 11 may be greater than or equal to 100 μm and less than or equal to 500 μm.

When the width of the strut 11 falls within the range described above, it is possible to provide the metal sheet 10 having the mesh structure with finer meshes.

A plurality of struts 11 may be laminated in the thickness direction of the metal sheet 10. The metal sheet 10 may include a portion where two or more layers and five or less layers of the strut 11 are laminated in the thickness direction of the metal sheet 10, for example. In another example, the metal sheet 10 may include a portion where three or more layers and four or less layers of the strut 11 are laminated in the thickness direction of the metal sheet 10. Further, in a case where a plurality of struts 11 are laminated in the thickness direction of the metal sheet 10, the plurality of struts 11 at a twisted position may have a laminated shape. According to these configurations, the mesh structure of the metal sheet 10 becomes a more complex shape.

As illustrated in FIG. 4, the metal sheet 10 has an extremely small thickness. For example, the metal sheet 10 may have a thickness greater than or equal to 10 μm and less than or equal to 100 μm. The thickness of the metal sheet 10 refers to a distance between the principal surface of the flat metal sheet 10 and the back surface located on the opposite side from the principal surface. In another example, the thickness of the metal sheet 10 may be greater than or equal to 10 μm and less than or equal to 80 μm. In still another example, the thickness of metal sheet 10 may be greater than or equal to 10 μm and less than or equal to 50 μm.

When the thickness of the metal sheet 10 falls within the range described above, it is possible to provide the metal sheet 10 having a small thickness. In the case where the thickness of the metal sheet 10 is small, the battery can be made thin when the metal sheet 10 is used as a collector of a battery electrode, for example.

As illustrated in FIG. 5, the metal sheet 10 may have a plurality of recesses 13 at the principal surface thereof. Hence, in a case where the metal sheet 10 is used as the collector of the battery, a high retention of the active material can be achieved. It is assumed that the recess 13 does not include the through hole 14 described above.

A diameter of recess 13 at the principal surface of metal sheet 10 may be greater than or equal to 1 μm and less than or equal to 900 μm. The diameter of the recess at the principal surface refers to a largest diameter portion of the recess at an outermost surface of the principal surface. In another example, the diameter of the recess 13 may be greater than or equal to 1 μm and less than or equal to 500 μm. In still another example, the diameter of the recess 13 may be greater than or equal to 1 μm and less than or equal to 100 μm. Further, the diameter of the recess 13 may be non-uniform along the thickness direction of the metal sheet 10.

According to such configurations, in a case where the metal sheet 10 is used as the collector of the battery, for example, a high retention of the active material can be achieved.

The number of the recesses 13 at the principal surface may be greater than or equal to 75 and less than or equal to 750 per 500 $\mu m^2$, for example. In another example, the number of recesses 13 at the principal surface may be greater than or equal to 75 and less than or equal to 500 per 500 $\mu m^2$. In still another example, the number of the recesses 13 at the principal surface may be greater than or equal to 75 and less than or equal to 250 per 500 $\mu m^2$.

When the number of the recesses 13 at the principal surface of the metal sheet 10 falls within the range described above, it is possible to retain a large amount of the active material when the metal sheet 10 used as the collector of the battery.

The number of the recesses 13 can be obtained by observing the principal surface of the metal sheet 10 using a microscope, counting the number of the recesses 13 present within the range of 500 $\mu m^2$ at ten arbitrary points on the principal surface, and averaging the counted numbers. The number of the recesses 13 may be counted by observing the principal surface of the metal sheet 10 using an optical microscope to make a 3D display, and counting the number of portions where the thickness is one-half the thickness of the metal sheet 10 or less.

The metal sheet 10 may include one or more kinds of materials selected from a group consisting of copper, nickel, aluminum, gold, silver, tin, and chromium. The metal sheet 10 may be made of one of these pure metals, or may be made of an alloy of such metals. In addition, a surface of one of these metals may be plated with another metal. Thus, it is possible to provide the metal sheet 10 suitable for various applications.

The metal sheet 10 can be used as the collector of the battery, an electromagnetic shield, a filter, a catalyst carrier, or the like, for example, by selecting the material thereof.

The metal sheet 10 may include tin in the surface thereof, and include copper in the interior thereof. Such a metal sheet 10 can be obtained by plating tin on the surface of the metal sheet 10 formed of copper, for example. A method of plating the tin is not particularly limited, and a known method may be employed, as appropriate.

By including the tin in the surface, it is possible to reduce self-discharge when the metal sheet 10 is used as a collector of a nickel-zinc battery, for example. Further, because the interior of the metal sheet 10 includes the copper, it is possible to reduce an electric resistance of the metal sheet 10.

In addition, in the metal sheet 10, the strut 11 and the node part 12 may have the surface and the interior covered by the surface, the surface may include tin, and the interior may include copper. Such a metal sheet 10 can be obtained by tin plating a metal porous body formed of copper having a skeleton of a three-dimensional mesh structure, and thereafter rolling the metal porous body, for example. The method of plating the tin is not particularly limited, and a known method may be employed, as appropriate.

Such a metal sheet 10 is also suited for use as the collector of the nickel-zinc battery.

<Battery, Nickel-Zinc Battery>

A battery according to one embodiment of the present disclosure includes the metal sheet 10 according to one embodiment of the present disclosure described above, as a collector. A nickel-zinc battery according to one embodiment of the present disclosure includes the metal sheet 10 according to one embodiment of the present disclosure, as a collector.

As described above, by appropriately selecting the material (kind of metal) of the metal sheet 10, or plating the surface of the metal sheet 10 with an appropriately selected metal, the metal sheet 10 can be used as a collector suitable for various batteries. In addition, because the metal sheet 10 has the through holes 14 and the recesses 13, a high retention of the active material can be achieved, thereby making the metal sheet 10 suitable for use as the collector.

In particular, as described above, it is possible to reduce the self-discharge, by suitably using the metal sheet 10 having the surface including the tin as the collector of the nickel-zinc battery. In the nickel-zinc battery according to one embodiment of the present disclosure, configurations of other than the collector are not particularly limited, and known configurations can be employed.

<Method for Manufacturing Metal Sheet>

A method for manufacturing a metal sheet according to one embodiment of the present disclosure includes step of preparing a metal porous body having a skeleton with a three-dimensional mesh structure (hereinafter also simply referred to as a "metal porous body"), and step of rolling the metal porous body in a thickness direction.

Figure 8:
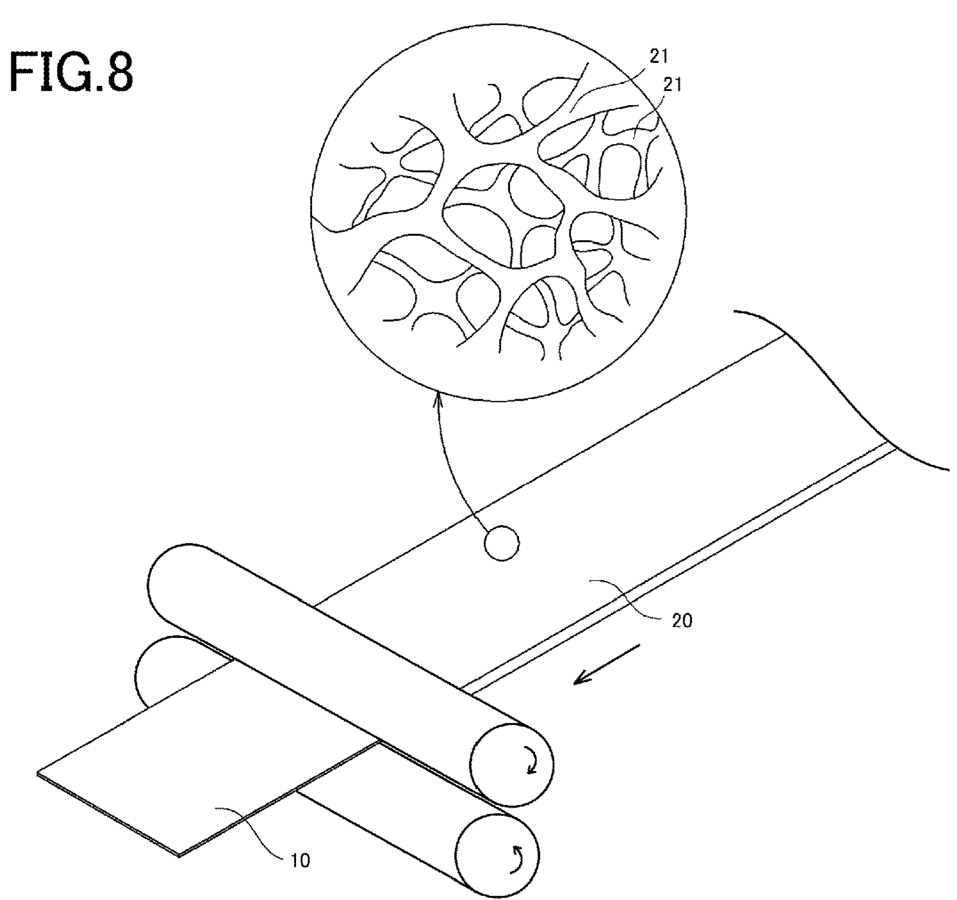
FIG. 8 is a diagram schematically illustrating an example of a method for manufacturing the metal sheet according to the present disclosure.
Figure 9:
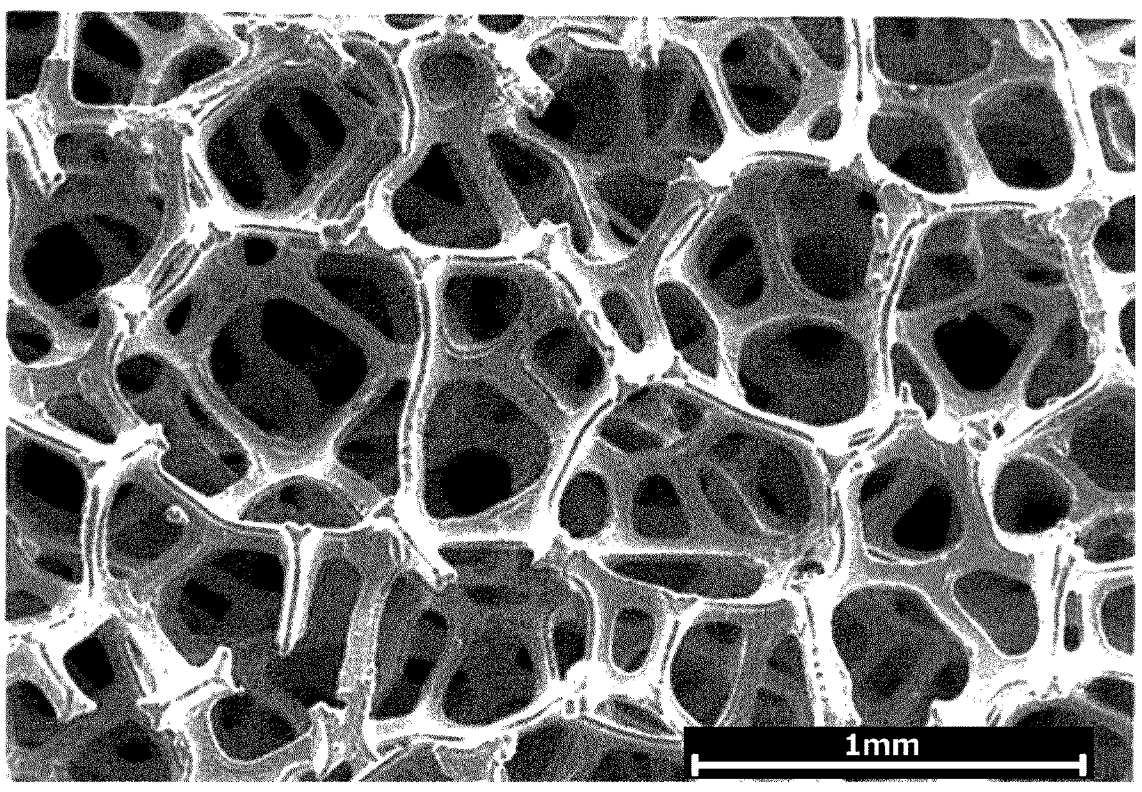
FIG. 9 is an electron microscope photograph of a cross section of a metal porous body having a skeleton with a three-dimensional mesh structure used in the method for manufacturing the metal sheet according to the present disclosure.
Figure 12:
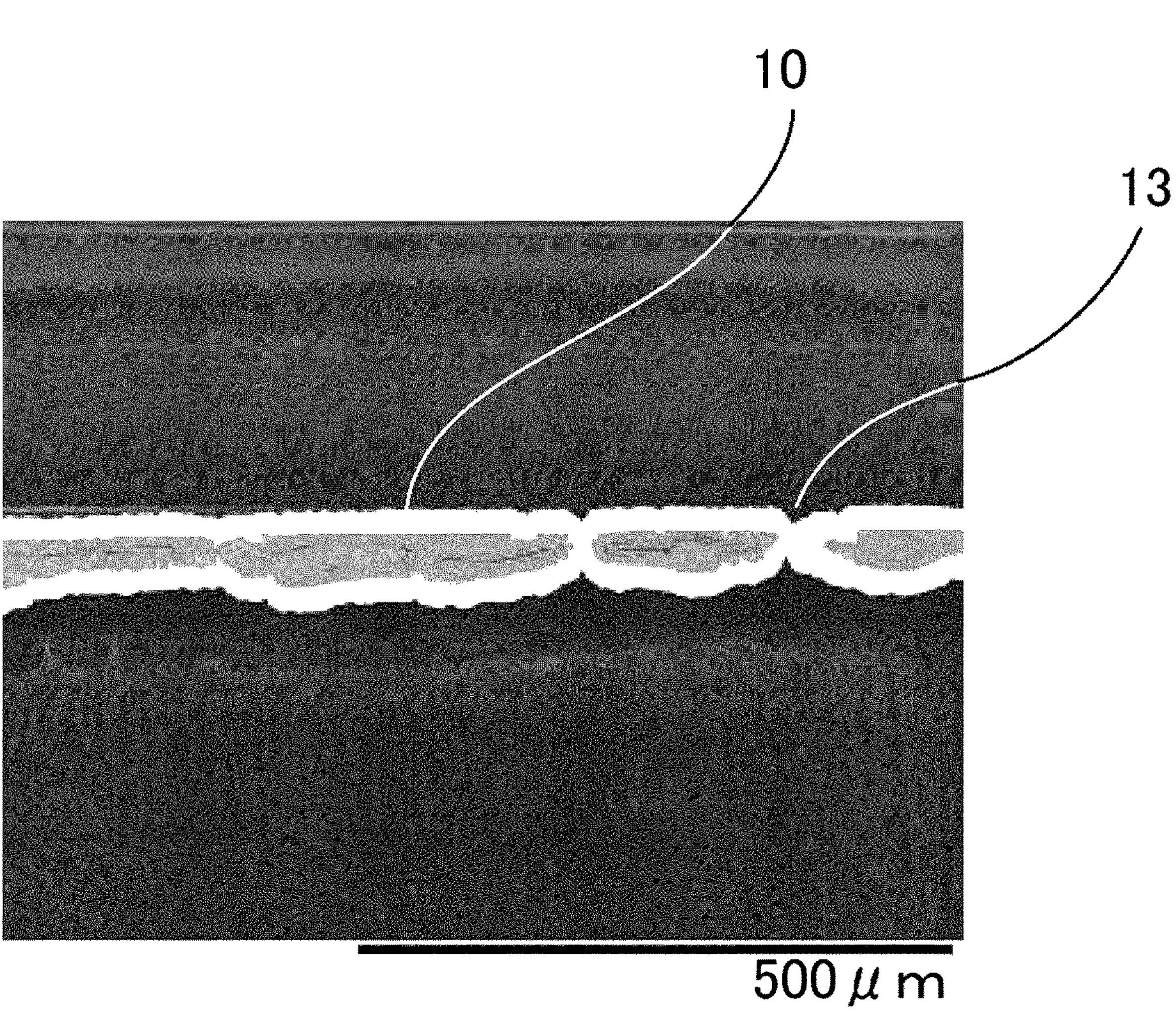
FIG. 12 is a partially enlarged photograph of the photograph illustrated in FIG. 11.

FIG. 8 schematically illustrates an example of the method for manufacturing the metal sheet according to one embodiment of the present disclosure. As illustrated in FIG. 8, a plate shaped metal porous body 20 having a skeleton 21 with a three-dimensional mesh structure is prepared. FIG. 9 illustrates an electron microscope photograph of a cross section of the metal porous body 20.

(Step of Preparing Metal Porous Body)

Nickel Celmet (Celmet is a registered trademark), aluminum Celmet (aluminum Celmet is a registered trademark), and copper Celmet manufactured by Sumitomo Electric Industries, Ltd., or the like, can be used as the metal porous body 20 having the skeleton 21 with the three-dimensional mesh structure. The metal porous body 20 formed of a material other than nickel, aluminum, or copper may be prepared in the following manner, for example. That is, the metal porous body 20 can be prepared by making a surface of a skeleton formed of an urethane foam conductive before a desired metal plating is formed on the surface of the skeleton, and thereafter burning and removing the urethane foam.

(Step of Rolling Metal Porous Body in Thickness Direction)

The metal sheet 10 according to one embodiment of the present disclosure can be obtained by rolling the metal porous body 20 prepared as described above in the thickness direction using roller press or the like, for example. A number of times the roller press is performed is not particularly limited, and the roller press may be performed a plurality of times, so as to obtain the metal sheet 10 having a desired thickness.

As a result, the skeleton 21 of the metal porous body 20 is compressed in the thickness direction to the rod shaped or plate shaped strut 11. Moreover, a branching portion of the skeleton 21 becomes the node part 12. Because the skeleton 21 of the metal porous body 20 before the rolling forms the three-dimensional mesh structure, the metal sheet 10 formed after the rolling includes a portion where a plurality of struts 11 in a twisted position has a laminated shape laminated in the thickness direction.

In addition, the surface of the metal sheet 10 manufactured as illustrated in FIG. 8 may be further plated with another metal. In this state, by adjusting a film thickness of the metal to be plated, it is also possible to adjust the number of recesses 13 and the number of through holes 14 of the metal sheet 10. Accordingly, it is possible to manufacture the metal sheet 10 having different kinds of metals in the surface and the interior of the metal sheet 10.

The surface of the skeleton 21 of the metal porous body 20 may be plated with another metal, before the press rolling. As a result, it is possible to manufacture the metal sheet 10 having the different kinds of metals in the surface and the interior of the strut 11 and the node part 12.

EXEMPLARY IMPLEMENTATIONS

Hereinafter, the present disclosure will be described in more detail based on exemplary implementations, but these exemplary implementations are merely examples, and the metal porous body or the like according to the present disclosure is not limited thereto. The scope of the present disclosure is indicated by the recitation of the claims, and includes all modifications within the meaning and scope equivalent to the recitation of the claims.

Exemplary Implementation 1

Copper Celmet (manufactured by Sumitomo Electric Industries, Ltd., grade: #6, number of cells: 40 to 53, average cell diameter: 540 μm, average pore diameter: 270 μm, specific surface area: 2800 $m^2/m^3$, thickness: 1000 μm) was prepared as the metal porous body 20.

This metal porous body 20 was rolled by the roller press to obtain a metal sheet 10 having a thickness of 60 μm.

The surface of the metal sheet 10 was plated with tin, so that the thickness of the plating film 16 becomes 3 μm. The tin plating was performed using a methanesulfonic acid tin plating bath.

The results of observing the surface and the interior of the obtained metal sheet 10 are illustrated in FIG. 1 through FIG. 7.

Exemplary Implementation 2

A metal sheet 10 was manufactured in the same manner as in the exemplary implementation 1, except that the tin plating was performed so that the thickness of the plating film becomes 14 μm.

Figures 13, 14:
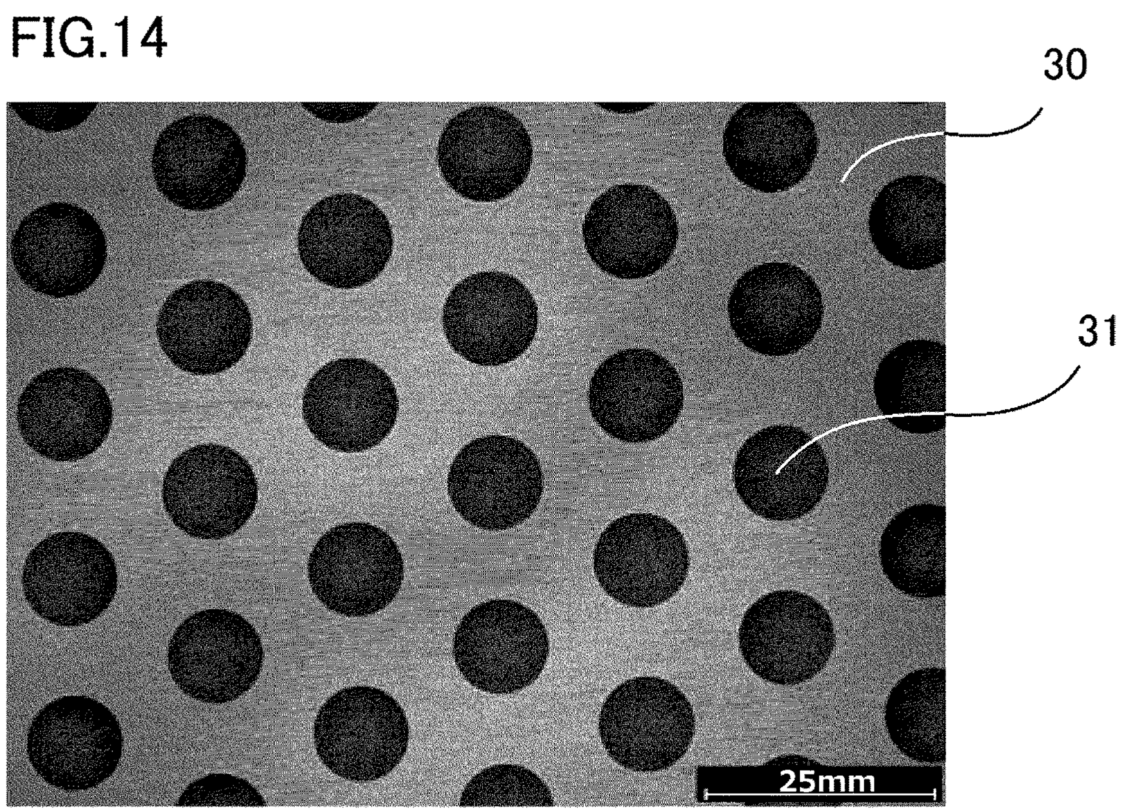
FIG. 13 is a partially enlarged photograph of the photograph illustrated in FIG. 12.
FIG. 14 is a photograph illustrating a result of observing a principal surface of a perforated metal using a scanning electron microscope (SEM).

The results of observing the surface and the interior of the obtained metal sheet 10 are illustrated in FIG. 10 through FIG. 13. As illustrated in FIG. 13, a tin plating film 16 having a large plating thickness was formed on the surface of the metal sheet 10 obtained in the exemplary implementation 2.

Comparative Example 1

A copper perforated metal 30 (copper foil etching material manufactured by Taiyo Wire Cloth Co., Ltd.) having openings 31 was prepared.

The perforated metal 30 was plated with tin, so that the thickness of the plating film 16 becomes 3 μm. The tin plating conditions were the same as in the exemplary implementation 1.

Figure 15:
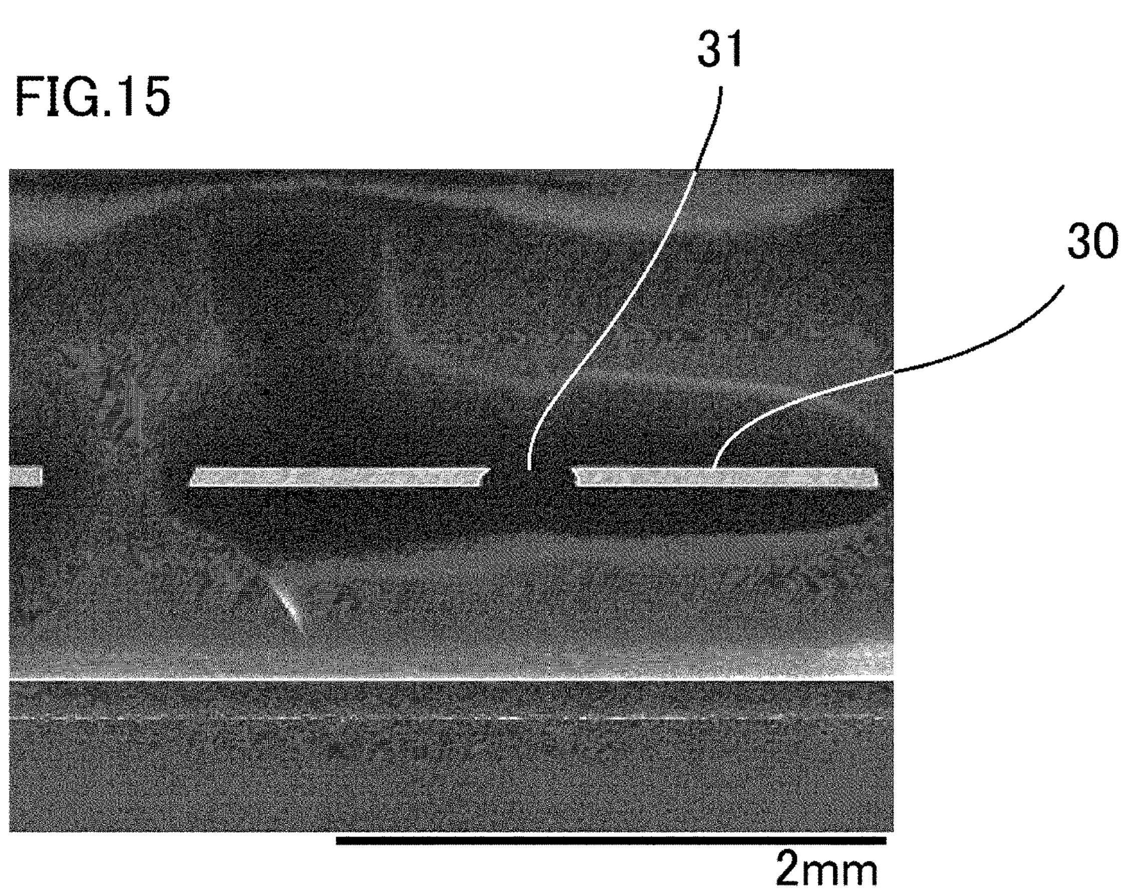
FIG. 15 is a photograph illustrating a result of observing a cross section of the perforated metal using a scanning electron microscope (SEM).
Figure 16:
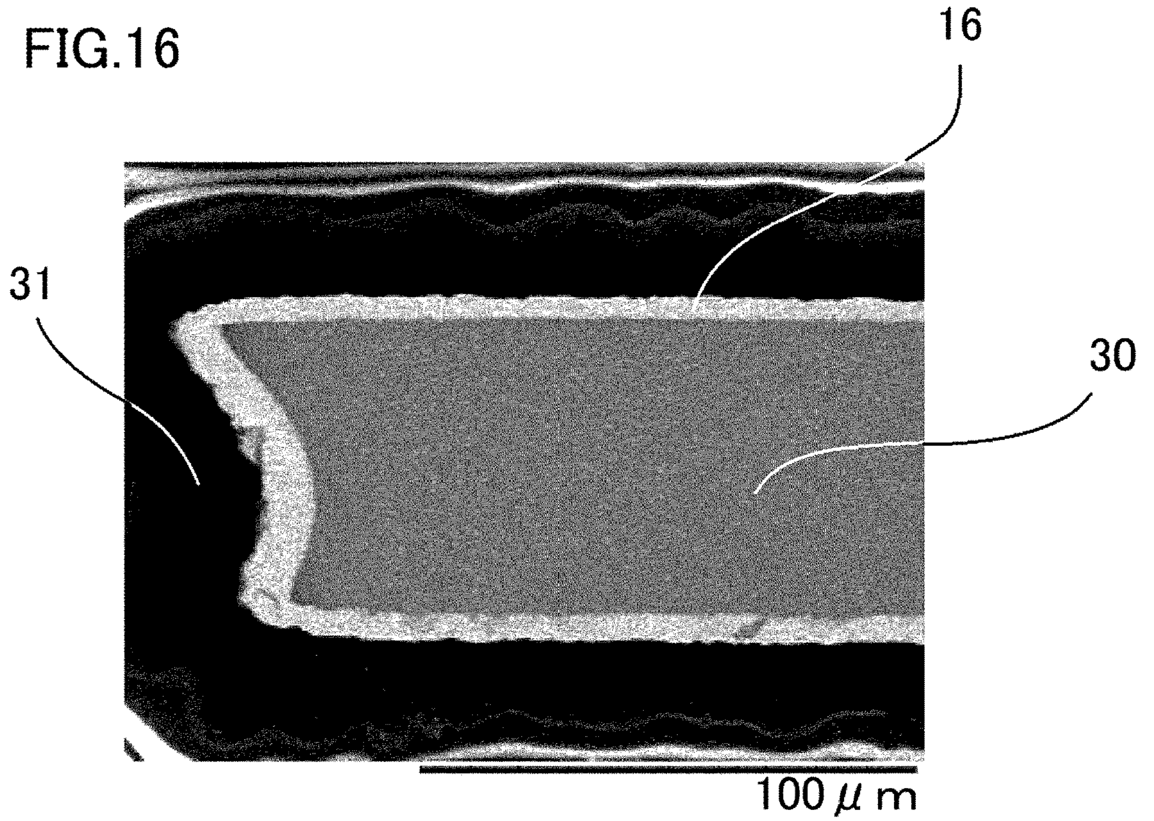
FIG. 16 is a partially enlarged photograph of the photograph illustrated in FIG. 15.

The external appearance and cross section of the perforated metal 30 observed using a scanning electron microscope are illustrated in FIG. 14 through FIG. 16.

Comparative Example 2

The metal porous body 20 (copper Celmet) prepared in the exemplary implementation 1 was plated with tin, so that the thickness of the plating film 16 becomes 3 μm. The tin plating conditions were the same as in the exemplary implementation 1.

<Evaluation>

External Appearance

Each of the values measured for the metal sheets 10 obtained in the exemplary implementation 1 and the exemplary implementation 2, based on the results observed using the scanning electron microscope, are illustrated in Table 1 and Table 2.

TABLE 1

| | Metal sheet | | | | Strut part | | |
|---|---|---|---|---|---|---|---|
| | Surface | Interior | Thickness (μm) | Porosity (%) | Thickness (μm) | Length (μm) | Width (μm) |
| Exemplary implementation 1 | Tin | Copper | 60 | 26 | 4 | 250 | 300 |
| Exemplary implementation 2 | Tin | Copper | 60 | 28 | 4 | 250 | 300 |

TABLE 2

| | Recess | | Through hole | |
|---|---|---|---|---|
| | | | | Hole |
| | Recesses/ 500 $\mu m^2$ | Diameter ($\mu$m) | Holes/ 500 $\mu m^2$ | diameter ($\mu$m) |
| Exemplary implementation 1 | 148 | 57 | 435 | 134 |
| Exemplary implementation 2 | 58 | 43 | 355 | 127 |

(Retention of Active Material)

In order to evaluate the retention of the active material, the following three kinds of active materials A through C having different viscosities were prepared by varying the solid content ratio. The active material was prepared by mixing zinc oxide, acetylene black, and a binder so that a weight ratio becomes 90:5:5 after drying, and a carboxymethyl cellulose (CMC) aqueous solution having a concentration of 0.5 mass % was used for a slurry adjustment.

Active material A (high-viscosity)

The solid content ratio was set to 61%.

Active material B (medium-viscosity)

The solid content ratio was set to 56%.

Active material C (low-viscosity)

The solid content ratio was set to 49%.

Then, each active material was coated on the metal sheets of exemplary implementation 1 and the exemplary implementation 2, the perforated metal of the comparative example 1, and the metal porous body of the comparative example 2, and extents of the retention of the active materials were evaluated. The results are illustrated in Table 3. In Table 3, a case where the active material did not flow out and a sufficient amount was retained is evaluated as "large", and a case where the active material flowed out or did not fill the openings and a sufficient amount was not retained is evaluated as "small".

TABLE 3

| | Active material | | |
|---|---|---|---|
| | A (solid content ratio: 61 mass %) | B (solid content ratio: 56 mass %) | C (solid content ratio: 49 mass %) |
| Exemplary implementation 1 | Large | Large | Large |
| Exemplary implementation 2 | Large | Large | Large |
| Comparative example 1 | Small | Small | Large |
| Comparative example 2 | Small | Large | Small |

As illustrated in Table 3, the metal sheet 10 according to one embodiment of the present disclosure includes the through holes 14 having the complex shape, and has a small thickness, such that a sufficient amount of the active material can be retained regardless of the viscosity of the active material.

DESCRIPTION OF REFERENCE NUMERALS

10: metal sheet, 11: strut, 12: node part, 13: recess, 14: through hole, 15: independent space, 16: plating film, 20: metal porous body, 21: skeleton, 30: perforated metal, 31: opening

The invention claimed is:

1. A flat metal sheet having a principal surface located on one side along a thickness direction, comprising:

a plurality of struts;

a node part where end portions of the plurality of struts are connected to one another, wherein the strut and the node part form a mesh structure, and the plurality of the struts are in close contact with each other; and a plurality of through holes penetrating the principal surface in the thickness direction, wherein:

the through holes have a hole diameter greater than or equal to 1 μm and less than or equal to 250 μm at the principal surface, and a thickness of the metal sheet is greater than or equal to 10 μm and less than or equal to 80 μm.

2. The metal sheet as claimed in claim 1, wherein the strut has a strip shape.

3. The metal sheet as claimed in claim 1, wherein the plurality of the struts at a twisted position has a laminated shape.

4. The metal sheet as claimed in claim 1, wherein the through holes have a non-uniform hole diameter along the thickness direction of the metal sheet.

5. The metal sheet as claimed in claim 1, wherein a number of the through holes provided per 500 $\mu m^2$ is greater than or equal to 250 and less than or equal to 2500 at the principal surface.

6. The metal sheet as claimed in claim 1, wherein a porosity is greater than or equal to 10% and less than or equal to 40%.

7. The metal sheet as claimed in claim 1, wherein the metal sheet has a surface and an interior, the surface includes the principal surface, a back surface located on an opposite side from the principal surface, and an outer peripheral surface of the metal sheet, the interior is covered by the surface, and the metal sheet has an independent space in the interior, surrounded by the strut and the node part.

8. The metal sheet as claimed in claim 1, wherein three or more struts are connected to the node part.

9. The metal sheet as claimed in claim 1, wherein the struts have a thickness greater than or equal to 1 μm and less than or equal to 10 μm.

10. The metal sheet as claimed in claim 1, wherein the struts have a length greater than or equal to 50 μm and less than or equal to 500 μm.

11. The metal sheet as claimed in claim 1, wherein the struts have a width greater than or equal to 100 μm and less than or equal to 3000 μm.

12. The metal sheet as claimed in claim 1, wherein the struts include a portion having two or more layers and five or less layers of the strut laminated in the thickness direction of the metal sheet.

13. The metal sheet as claimed in claim 1, wherein a thickness of the metal sheet is greater than or equal to 10 μm and less than or equal to 50 μm.

14. The metal sheet as claimed in claim 1, wherein the metal sheet has a plurality of recesses at the principal surface.

15. The metal sheet as claimed in claim 14, wherein the recesses have a diameter greater than or equal to 1 μm and less than or equal to 900 μm at the principal surface.

16. The metal sheet as claimed in claim 14, wherein the recesses have a non-uniform diameter along the thickness direction of the metal sheet.

17. The metal sheet as claimed in claim 14, wherein a number of the recesses provided per 500 $\mu m^2$ is greater than or equal to 75 and less than or equal to 750 at the principal surface.

18. The metal sheet as claimed in claim 17, wherein
the surface includes tin, and
the interior includes copper.

19. A nickel-zinc battery comprising:
the metal sheet according to claim 18 as a collector.

20. The metal sheet as claimed in claim 1, wherein the metal sheet is formed of one or more kinds of materials selected from a group consisting of copper, nickel, aluminum, gold, silver, tin, and chromium.

21. The metal sheet as claimed in claim 1, wherein
the strut and the node part have a surface, and an interior surrounded by the surface,
the surface includes tin, and
the interior includes copper.

22. A battery comprising:
the metal sheet according to claim 1 as a collector.

23. A method for forming a metal sheet comprising:
step of preparing a metal porous body having a flat shape and a skeleton with a three-dimensional mesh structure; and
step of rolling the metal porous body in a thickness direction to manufacture the metal sheet according to claim 1.

* * * * *